US009563002B2

(12) United States Patent
Chen

(10) Patent No.: US 9,563,002 B2
(45) Date of Patent: Feb. 7, 2017

(54) ULTRATHIN PLANAR LIGHT SOURCE APPARATUS

(71) Applicant: Shenzhen China Star Optoelectronics Technology Co., Ltd., Shenzhen, Guangdong (CN)

(72) Inventor: Lingyan Chen, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 136 days.

(21) Appl. No.: 14/428,363

(22) PCT Filed: Jan. 27, 2015

(86) PCT No.: PCT/CN2015/071632
§ 371 (c)(1),
(2) Date: Mar. 14, 2015

(87) PCT Pub. No.: WO2016/106915
PCT Pub. Date: Jul. 7, 2016

(65) Prior Publication Data
US 2016/0187561 A1    Jun. 30, 2016

(30) Foreign Application Priority Data
Dec. 31, 2014  (CN) .......................... 2014 1 0855079

(51) Int. Cl.
*F21V 9/14*  (2006.01)
*F21V 8/00*  (2006.01)
*G02B 5/30*  (2006.01)

(52) U.S. Cl.
CPC ............... *G02B 6/0023* (2013.01); *F21V 9/14* (2013.01); *G02B 5/3025* (2013.01); *G02B 6/0055* (2013.01); *G02B 6/0073* (2013.01)

(58) Field of Classification Search
CPC ....... F21V 9/14; G02B 5/3025; G02B 6/0023; G02B 6/0055; G02B 6/0073
See application file for complete search history.

(56) References Cited

U.S. PATENT DOCUMENTS

| 2009/0219735 A1* | 9/2009 | Li | G02B 6/0023 362/621 |
| 2013/0258634 A1* | 10/2013 | Xu | G02B 5/0231 362/19 |
| 2016/0170126 A1* | 6/2016 | Sasaki | H01L 33/60 349/65 |

FOREIGN PATENT DOCUMENTS

JP         2013101892 A  *  5/2013  ................ F21S 2/00

OTHER PUBLICATIONS

Koji Sakai, "Claimed + Detailed Description" English Translation of JP 2013101892 A, Sep. 20, 2016, pp. 1-12.*

* cited by examiner

*Primary Examiner* — Alan Cariaso
(74) *Attorney, Agent, or Firm* — Andrew C. Cheng

(57) ABSTRACT

The disclosure is related to an ultrathin planar light source apparatus, comprising a LED light source and a light guide plate; the LED light source comprises a light emitting chip which is disposed opposite to a light incident side of the light guide plate; a polarizer parallel to the light guide plate and disposed between the light emitting chip and the light guide plate; the polarizer projects the light emitted from the light emitting chip toward the light guide plate. The disclosure controls the light emitted from the LED light source well to deflect within a certain range of angles such that the light completely enter into the light guide plate without increasing the thickness of the light guide plate.

17 Claims, 2 Drawing Sheets

ULTRATHIN PLANAR LIGHT SOURCE APPARATUS

BACKGROUND OF THE INVENTION

1. Field of the Invention

The disclosure relates to a backlight display technology field, and more particularly to an ultrathin planar light source apparatus.

2. The Related Arts

Light Emitting Diode (LED) is a new type power-saving light source with high competitiveness. The trend is gradually replacing the traditional light source. LED has some advantages such that highly luminous efficiency, good light quality, high color purity, suitable voltage-controlled, low power consumption and long life span. The backlight source provides the light source for the liquid crystal display (LCD). The backlight source mainly comprises the light source, the light guide plate, the optical films and the plastic frame. The backlight source is required to have the advantages of high brightness, long life span and uniform luminance. LED is widely used because of its many advantages in LCD backlight.

Since the introduction of the concept of the ultrathin LCD, the backlight mostly adopts the edge lit illumination. Increasing the brightness and ensuring the uniformity of brightness of the panel are achieved by using the light guide plate to guide the light scattering direction. LED lamp is required to be a good fit with the light guide plate in order to allow more light to enter the light guide plate. The principle of LED light-emitting is that the PN junction is powered to emit the light by itself. The emitting angle is isotopically and uniformly scattered through 360 degrees. The emitting angle of the SMD LED is 120 degrees in general. A great loss of light is produced because the light emitting from the LED lamps does not enter the light guide plate completely.

In order to increase the light utilization efficiency, there is one technical solution in which the light incident side of the light guide plate near the LED light source is made as a wedge. It can increase the area of the light incident side to receive more light beams and increase the light utilization efficiency. This technical solution cannot apply in the ultrathin apparatus because of the increasing thickness of the light guide plate.

SUMMARY

In view of the deficiencies existing in the current technology, one embodiment of the disclosure provides an ultrathin planar light source apparatus with high light utilization efficiency.

In order to accomplish the above purpose, the disclosure provides the following technical solutions.

In one embodiment, the disclosure provides an ultrathin light source apparatus comprising a LED light source and a light guide plate. The LED light source comprising a light emitting chip is disposed opposite to the light incident side of the light guide plate. A polarizer parallel to the light guide plate is disposed between the light emitting chip and the light guide plate. The polarizer projects the light emitted from the light emitting chip toward the light guide plate.

In one embodiment, the light emitting chip is disposed on the base of the light source; the LED light source further comprises a transparent adhesive sealing the light emitting chip.

In one embodiment, the polarizer comprises a plurality of indented grooves; each indented groove comprises an upper surface and a lower surface; an inclination angle of the upper surface of the indented grooves with respect to the light incident side is smaller than an inclination angle of the lower surface of the indented grooves with respect to the light incident side.

In one embodiment, the polarizer is disposed on the adhesive and integrally provided with the adhesive.

Alternatively, the polarizer is fixed on the on the adhesive.

In one embodiment, the polarizer and the adhesive are arranged at an interval.

In one embodiment, the lower surface of the indented grooves is a light reflective surface.

In one embodiment, the lower surface of the indented grooves is perpendicular to the light incident side.

Another embodiment of the disclosure provides an ultrathin light source apparatus, comprising a reflective sheet disposed at the lower surface of the light guide plate; the length of the reflective sheet at the light incident side is longer than the length of the light guide plate.

The disclosure controls the light emitted from the LED light source well to deflect within a certain range of angle such that the light completely enters into the light guide plate without increasing the thickness of the light guide plate. The disclosure increases the light utilization efficiency and conduces to make the light guide plate and the light source apparatus future thinner.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which.

DETAILED DESCRIPTION

The following description with reference to the accompanying drawings is provided to clearly and completely explain the exemplary embodiments of the disclosure. It is apparent that the following embodiments are merely some embodiments of the disclosure rather than all embodiments of the disclosure. According to the embodiments in the disclosure, all the other embodiments attainable by those skilled in the art without creative endeavor belong to the protection scope of the disclosure.

Embodiment 1

Figure 1:
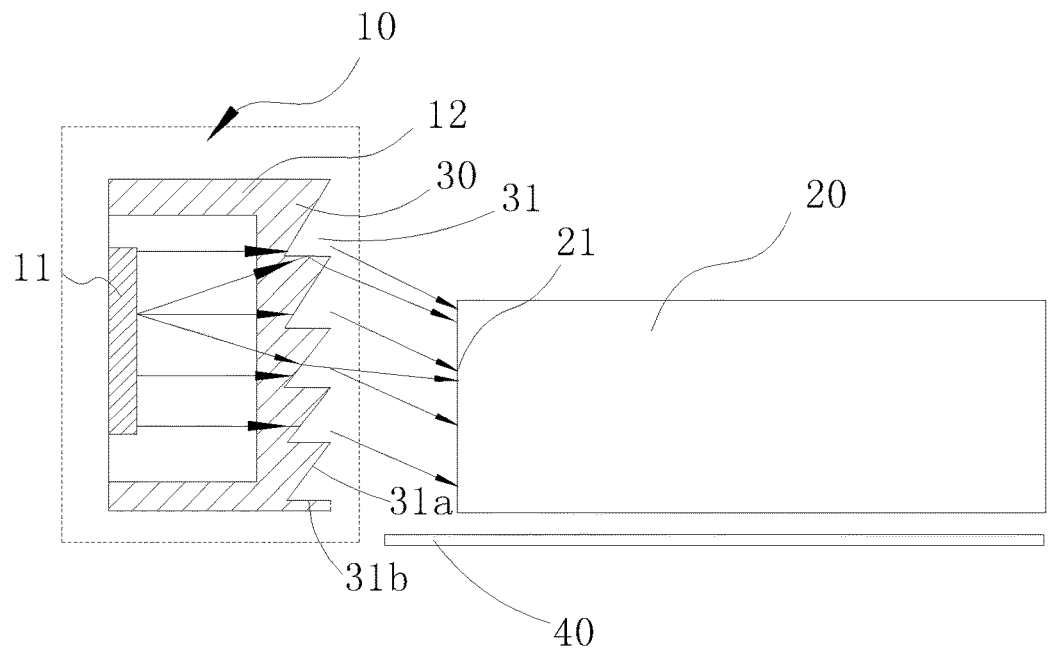
FIG. 1 is the schematic diagram of an ultrathin light source apparatus of Embodiment 1 according to the disclosure.

Refer to FIG. 1. The ultrathin light source apparatus of the disclosure comprises a LED light source 10 and a light guide plate 20. The LED light source 10 comprises a light emitting chip 11 and a transparent adhesive 12 sealing the light emitting chip 11. The LED light source 10 is disposed opposite to a light incident side 21 of the light guide plate 20. A polarizer 30 parallel to the light guide plate 20 and disposed between the light emitting chip 11 and the light guide plate 20. The polarizer 30 projects the light emitted from the light emitting chip 11 toward the light guide plate 20.

Specifically, the surface that the polarizer 30 opposite to the light guide plate 20 (the surface facing the light incident side 21 in the figure) comprises a plurality of indented grooves 31 arranged in longitudinal direction. Each indented groove 31 comprises an upper surface 31a and a lower surface 31b. An inclination angle of the upper surface 31a of the indented grooves 31 with respect to the light incident side is smaller than an inclination angle of the lower surface 31b of the indented grooves 31 with respect to the light incident side 21. The light emitted from the light emitting chip 11 is deflected to the right lower side and enters the light guide plate 20 through the light incident side 21 by such configuration. The divergence angle of the LED light source 10 decreases and the light utilization efficiency is greatly improved. The polarizer 30 of the disclosure is disposed on the adhesive 12 and integrally provided with the adhesive 12.

Further, the lower surface 31b of the indented grooves is a light reflective surface. The partial light emitted from the light emitting chip 11 illuminates into the rear side of the lower surface 31b and enters the light guide plate 20 after reflected to the right lower side. The lower surface of the indented grooves of this embodiment is perpendicular to the light incident side.

A reflective sheet 40 is disposed at a lower surface of the light guide plate 20. The reflective sheet 40 is used to reflect the light irradiating the bottom side of the light guide plate 20. The length of the reflective sheet at the light incident side 21 is longer than the length of the light guide plate 20. The partial light polarized by the polarizer 30 cannot directly irradiate to the light incident side 21. The partial light reflected by the reflective sheet 40 and irradiates into the light incident side 21. The reflective sheet 40 can prevent the light leakiness and increase the light utilization efficiency.

Embodiment 2

Figure 2:
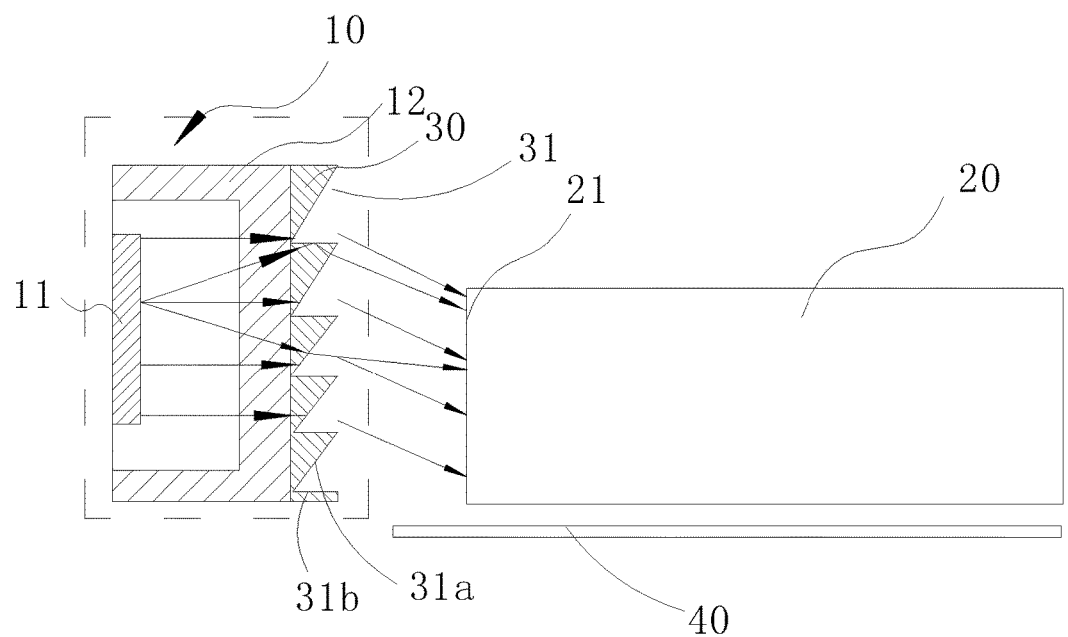
FIG. 2 is the schematic diagram of part of the ultrathin light source apparatus of Embodiment 2 according to the disclosure.

As shown in FIG. 2, the difference between this embodiment and the Embodiment 1 is that the polarizer 30 is fixed on the adhesive 12 and close to the outer surface of the adhesive 12. The polarizer 30 is an optical film specifically and disposed on the outer surface of the adhesive 12 by pasting.

Embodiment 3

Figure 3:
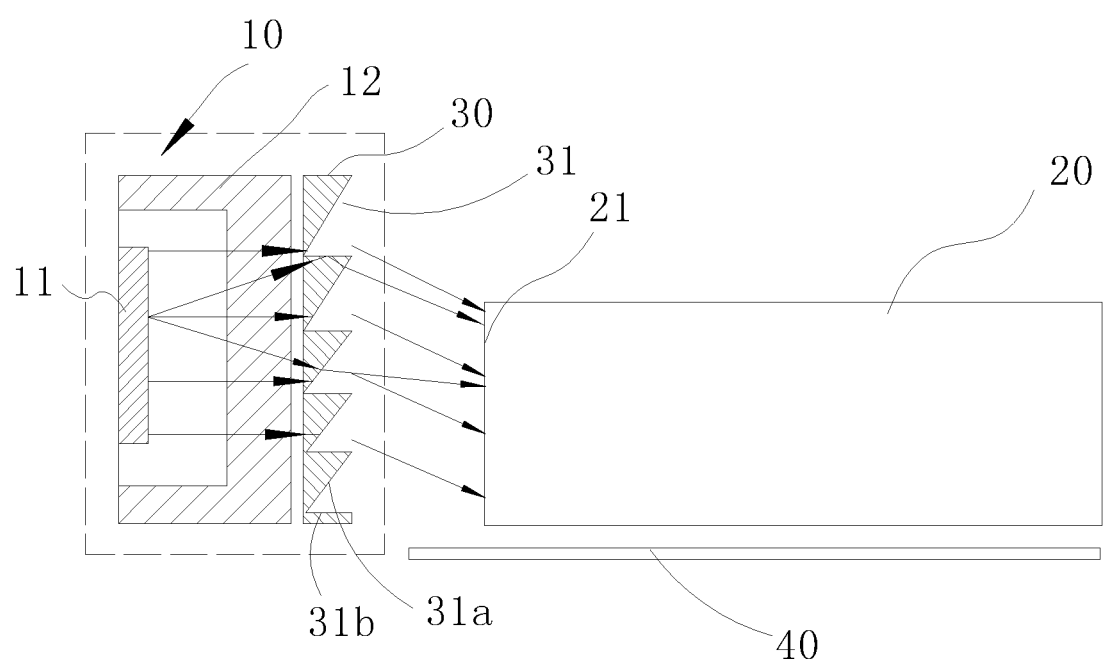
FIG. 3 is the schematic diagram of an ultrathin light source apparatus of Embodiment 3 according to the disclosure.

As shown in FIG. 3, the difference between this embodiment and the Embodiment 1 is that the polarizer 30 does not contact the adhesive 12. The polarizer and the adhesive are arranged at an interval. The polarizer 30 can be fixed on the corresponding specific structure of the display apparatus, such as the plastic frame, and the metal frame, etc.

In summary, according to the embodiment, the polarizer 30 is disposed between the light emitting chip 11 and the light guide plate 20. The polarizer 30 controls the light emitted from the LED light source well to deflect within a certain range of angle. The light completely enters into the light guide plate without increasing the thickness of the light guide plate. The disclosure increases the light utilization efficiency and conduces to make the light guide plate and the light source apparatus future thinner.

Note that the specifications relating to the above embodiments should be construed as exemplary rather than as limitative of the present disclosure. The equivalent variations and modifications on the structures or the process by reference to the specification and the drawings of the disclosure, for example the combination of the technical features in each embodiment, and application to the other relevant technology fields directly or indirectly should be construed similarly as falling within the protection scope of the disclosure.

What is claimed is:

1. An ultrathin planar light source apparatus, comprising:
   a light guide plate having a light incident side;
   a LED light source comprising a light emitting chip disposed opposite to the light incident side of the light guide plate; and
   a polarizer parallel to the light guide plate and disposed between the light emitting chip and the light guide plate;
   wherein the polarizer projects the light emitted from the light emitting chip toward the light guide plate;
   wherein the polarizer comprises a plurality of indented grooves; each indented groove comprises a upper surface and a lower surface; an inclination angle of the upper surface of the indented grooves with respect to the light incident side is smaller than an inclination angle of the lower surface of the indented grooves with respect to the light incident side.

2. The ultrathin planar light source apparatus according to claim 1, wherein the light emitting chip is disposed on a base of the light source; the LED light source further comprises a transparent adhesive sealing the light emitting chip.

3. The ultrathin planar light source apparatus according to claim 1, wherein the lower surface of the indented grooves is a light reflective face.

4. The ultrathin planar light source apparatus according to claim 3, wherein the lower surface of the indented grooves is perpendicular to the light incident side.

5. The ultrathin planar light source apparatus according to claim 3, further comprising a reflective sheet disposed at a lower surface of the light guide plate; a length of the reflective sheet at the light incident side is longer than a length of the light guide plate.

6. The ultrathin planar light source apparatus according to claim 2, wherein the polarizer is disposed on the adhesive and integrally provided with the adhesive.

7. The ultrathin planar light source apparatus according to claim 6, wherein the lower surface of the indented grooves is a light reflective face.

8. The ultrathin planar light source apparatus according to claim 7, wherein the lower surface of the indented grooves is perpendicular to the light incident side.

9. The ultrathin planar light source apparatus according to claim 7, further comprising a reflective sheet disposed at a lower surface of the light guide plate; a length of the reflective sheet at the light incident side is longer than a length of the light guide plate.

10. The ultrathin planar light source apparatus according to claim 2, wherein the polarizer is disposed on the adhesive.

11. The ultrathin planar light source apparatus according to claim 10, wherein the lower surface of the indented grooves is a light reflective face.

12. The ultrathin planar light source apparatus according to claim 11, wherein the lower surface of the indented grooves is perpendicular to the light incident side.

13. The ultrathin planar light source apparatus according to claim 11, further comprising a reflective sheet disposed at a lower surface of the light guide plate; a length of the reflective sheet at the light incident side is longer than a length of the light guide plate.

14. The ultrathin planar light source apparatus according to claim 2, wherein the polarizer and the adhesive are arranged at an interval.

15. The ultrathin planar light source apparatus according to claim 14, wherein the lower surface of the indented grooves is a light reflective face.

16. The ultrathin planar light source apparatus according to claim 15, wherein the lower surface of the indented grooves is perpendicular to the light incident side.

17. The ultrathin planar light source apparatus according to claim 15, further comprising a reflective sheet disposed at a lower surface of the light guide plate; a length of the reflective sheet at the light incident side is longer than a length of the light guide plate.

* * * * *